(12) United States Patent
Xie et al.

(10) Patent No.: US 10,047,898 B2
(45) Date of Patent: Aug. 14, 2018

(54) GIMBAL ASSEMBLY AND HAND-HELD DEVICE

(71) Applicant: ZEROTECH (SHENZHEN) INTELLIGENCE ROBOT CO., LTD., Shenzhen (CN)

(72) Inventors: Zhangtao Xie, Beijing (CN); Hongtao Sun, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 1 day.

(21) Appl. No.: 15/219,506

(22) Filed: Jul. 26, 2016

(65) Prior Publication Data

US 2017/0336018 A1 Nov. 23, 2017

(30) Foreign Application Priority Data

May 17, 2016 (CN) .......................... 2016 1 0327305

(51) Int. Cl.
| | |
|---|---|
| *F16M 11/18* | (2006.01) |
| *F16M 13/04* | (2006.01) |
| *F16M 13/02* | (2006.01) |
| *F16M 11/12* | (2006.01) |
| *G03B 17/56* | (2006.01) |

(52) U.S. Cl.
CPC ............ *F16M 11/18* (2013.01); *F16M 11/12* (2013.01); *F16M 13/022* (2013.01); *F16M 13/04* (2013.01); *G03B 17/561* (2013.01)

(58) Field of Classification Search
CPC .................................................... G03B 17/561
See application file for complete search history.

(56) References Cited

U.S. PATENT DOCUMENTS

| | | | | |
|---|---|---|---|---|
| 4,736,218 A | * | 4/1988 | Kutman ................. | F16M 11/18 348/143 |
| 7,832,947 B2 | * | 11/2010 | Takahashi .............. | G03B 17/00 310/311 |
| 2012/0045197 A1 | * | 2/2012 | Jones ..................... | G03B 17/02 396/427 |
| 2013/0294759 A1 | * | 11/2013 | Honsho .................. | G03B 37/00 396/428 |
| 2014/0348498 A1 | * | 11/2014 | Aiba ....................... | G03B 13/32 396/20 |
| 2015/0381858 A1 | * | 12/2015 | Sterngren ............... | F16H 57/12 348/143 |
| 2016/0286119 A1 | * | 9/2016 | Rondinelli ............. | G03B 17/12 |
| 2016/0352992 A1 | * | 12/2016 | Saika .................... | H04N 5/2328 |
| 2017/0198747 A1 | * | 7/2017 | Chen ..................... | B64C 39/024 |

* cited by examiner

*Primary Examiner* — Clayton E LaBalle
*Assistant Examiner* — Dennis Hancock
(74) *Attorney, Agent, or Firm* — Scully Scott Murphy & Presser

(57) ABSTRACT

A gimbal assembly and a hand-held device are provided. The gimbal assembly includes a gimbal, an image pick-up device and a light-transmitting cover covering the gimbal and the image pick-up device. The gimbal includes a holding assembly, the holding assembly is configured to drive the image pick-up device to rotate around at least one axis in the light-transmitting cover. The at least one axis passes through a spherical center of the light-transmitting cover, and upon the image pick-up device rotating, an optical axis of a lens of the image pick-up device always coincides with a normal line of a tangent plane at an intersection of the optical axis and the light-transmitting cover.

7 Claims, 5 Drawing Sheets

GIMBAL ASSEMBLY AND HAND-HELD DEVICE

TECHNICAL FIELD

The present disclosure relates to a gimbal assembly and a hand-held device.

BACKGROUND

Generally, a gimbal is used for mounting and fixing an image pick-up device such as a video camera, a camera and so on, a motion of the gimbal is controlled by an electric motor, and then a position of the image pick-up device mounted on the gimbal is adjusted, to achieve scanning, image pick-up and monitoring in a wide range. In order to protect the image pick-up device, a transparent cover is provided thereon, to prevent the image pick-up device from being damaged during use. However, since ambient light is refracted after passing through the transparent cover, when the image pick-up device shoots in different positions in the transparent cover, captured image has defects such as distortion, blurring, uneven brightness and so on under the influence of light.

SUMMARY

An embodiment of the disclosure provides a gimbal assembly, comprising a gimbal, an image pick-up device and a light-transmitting cover covering the gimbal and the image pick-up device, wherein, the gimbal includes a holding assembly, the holding assembly is configured to drive the image pick-up device to rotate around at least one axis in the light-transmitting cover; the at least one axis passes through a spherical center of the light-transmitting cover, and upon the image pick-up device rotating, an optical axis of a lens of the image pick-up device always coincides with a normal line of a tangent plane at an intersection of the optical axis and the light-transmitting cover.

Another embodiment of the disclosure provides a hand-held device, comprising a holding part and the gimbal assembly as mentioned above, the gimbal being arranged on the holding part, and the light-transmitting cover being detachably arranged on an end of the holding part.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
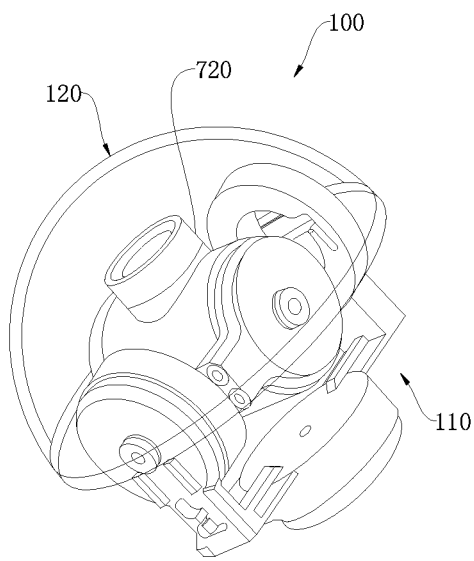
FIG. 1 is a perspective schematic diagram of a gimbal assembly of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

It should be noted that: similar reference numerals and letters refer to similar items in the following drawings, and therefore, once an item is defined in one diagram, it is not necessary to further define and explain the item in the subsequent diagrams.

In the description of the present disclosure, it should be noted that, azimuth or positional relationships indicated by terms such as "center" "up", "down", "left", "right", "vertical", "horizontal", "inside", "outside" and so on, are based on the azimuth or positional relationships illustrated in the drawings, or the usual azimuth or positional relationships when using the product of the present disclosure, which are only to facilitate description of the embodiment of the disclosure and simplify the description, but not to indicate or imply that the device or component must have a specific azimuth, or be constructed or operated in the specific azimuth, which thus cannot be understood as a limitation to the present disclosure. Furthermore, terms such as "first", "second", "third" and so on are only used for distinguishing description, and cannot be construed as indicating or implying relative importance.

Furthermore, terms such as "horizontal", "vertical" and so on do not require the parts to be absolute horizontal or overhanging, but may be slightly inclined. For example, the "horizontal" only refers to a direction thereof more horizontal than the "vertical", does not mean that this structure must be completely horizontal, but may be slightly inclined.

In the description of the present disclosure, it should be further noted that, unless otherwise clearly regulated and defined, terms such as "arranged", "mounted", "connected" should be broadly interpreted, for example, it may be fixedly connected, or may be detachably connected, or integrally connected; it may be mechanically connected, or may be electrically connected; it may be directly connected, or may be indirectly connected via an intermediate medium, or may be communicating between insides of two members. For those ordinarily skilled in the art, the specific meanings of the terms in the present disclosure can be understood according to specific conditions.

Please refer to FIG. 1, the present embodiment provides a gimbal assembly 100, which comprises a gimbal 110 and a light-transmitting cover 120 arranged outside the gimbal 110. The light-transmitting cover 120 covers the gimbal 110, and the light-transmitting cover 120 is used for protecting the gimbal 110 and an image pick-up device 720 arranged on the gimbal 110.

In the embodiment, the light-transmitting cover 120 is of a hemisphere, which may further be of a sphere or an arc. In addition, it should be noted that, the "hemisphere" here is not limited to half of a sphere, but any suitable part of the sphere, for example, may be ¾, ⅔, ⅓ of the sphere and so on.

The light-transmitting cover 120 is made of a transparent or a semi-transparent material, for example, may be made of polycarbonate (PC), polymethyl methacrylate (PMMA), polystyrene plastics (PS), polyester resin (PET), PETG acrylon-styrene copolymer (AS), butadiene-styrene copolymer (BS), MS, MBS resin, transparent ABS, transparent polypropylene (PP) or transparent polyamide (PA).

The light-transmitting cover 120 can further include an external coating layer (not illustrated). When an anti-reflection (AR) coating process is used, the light-transmitting cover 120 may be having transmittance increased, anti-static, having reflection reduced, anti-scratch and anti-water; when an anti-water coating process is used, the light-transmitting cover 120 may be anti-water and anti-fog; and when a hard-coating process is used, the light-transmitting cover 120 may be hardened, having transmittance increased and anti-scratch.

Please refer to FIG. 2 to FIG. 5, the gimbal 110 includes a drive unit 200, a rotation unit 300 and a connecting unit 400, and the drive unit 200 drives the rotation unit 300 to rotate.

The drive unit 200 includes a first drive part 210, a second drive part 220 and a third drive part 230. The rotation unit 300 includes a first rotation part 301, a second rotation part 302 and a third rotation part 303. The connecting unit 400 includes a first connecting piece 410, a second connecting piece 420 and a third connecting piece 430.

A first end 411 of the first connecting piece is connected with the first drive part 210, the first drive part 210 drives the first rotation part 301, a second end 412 of the first connecting piece is connected with the second rotation part 302, and the second rotation part 302 is driven by the second drive part 220; a first end 421 of the second connecting piece is connected with the second drive part 220, a second end 422 of the second connecting piece is connected with the third connecting piece 430, the second end 422 of the second connecting piece is connected with a first end 431 of the third connecting piece, a second end 432 of the third connecting piece is connected with the third rotation part 303, and the third rotation part 303 is driven by the third drive part 230. That is to say, the first drive part 210 is connected with the second rotation part 302 by the first connecting piece, and the second drive part 220 is connected with the third rotation part 303 by the second connecting piece and the third connecting piece, and in this way, the image pick-up device 720 may rotate around three axes, and shoots respective positions.

In the embodiment, the gimbal 110 is connected with other devices or parts (not illustrated) through the third drive part 230.

In the embodiment, the second connecting piece 420 and the third connecting piece 430 are detachably connected with each other by bolts, and there is an angle (e.g., 90 degree) between the second connecting piece 420 and the third connecting piece 430. It should be understood that, the second connecting piece 420 and the third connecting piece 430 may also be integrally formed.

Figure 2:
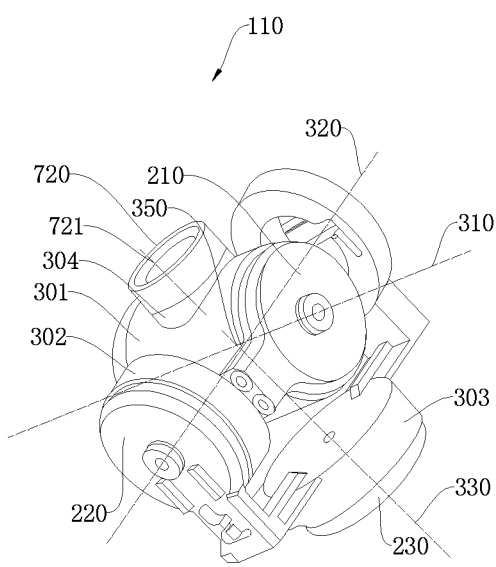
FIG. 2 is a perspective schematic diagram of a gimbal of the gimbal assembly of the present disclosure.
Figure 3:
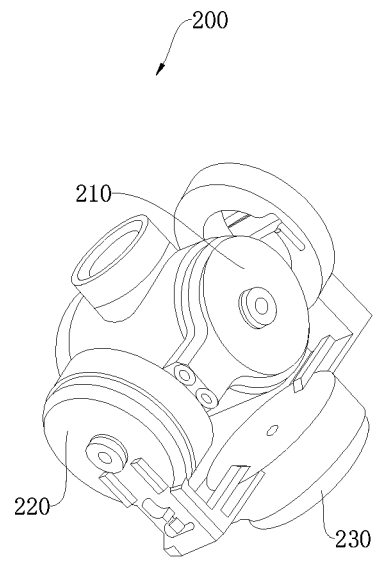
FIG. 3 is a perspective schematic diagram of the gimbal assembly of the present disclosure with a drive unit marked.
Figure 4:
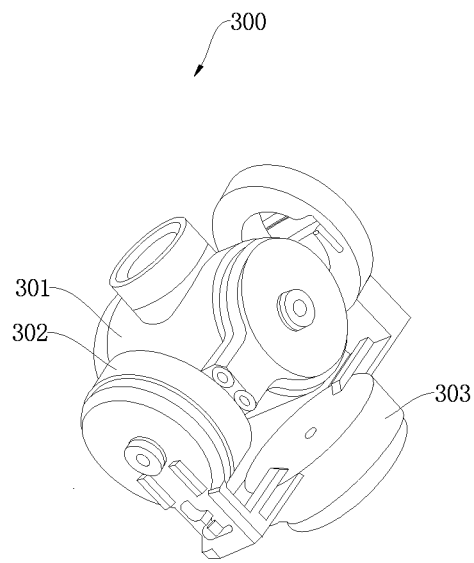
FIG. 4 is a perspective schematic diagram of the gimbal assembly of the present disclosure with a rotation unit marked.
Figure 5:
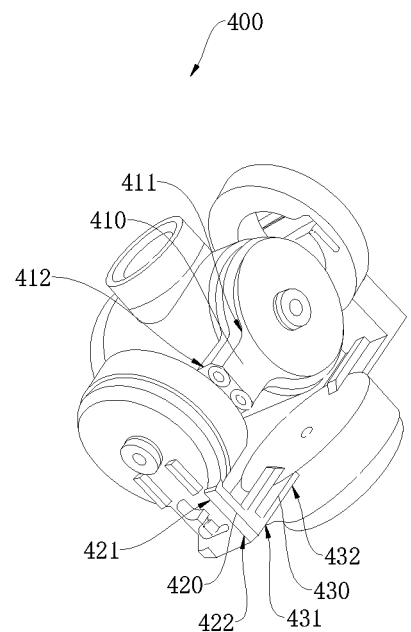
FIG. 5 is a perspective schematic diagram of the gimbal assembly of the present disclosure with a connecting unit marked.
Figure 6:
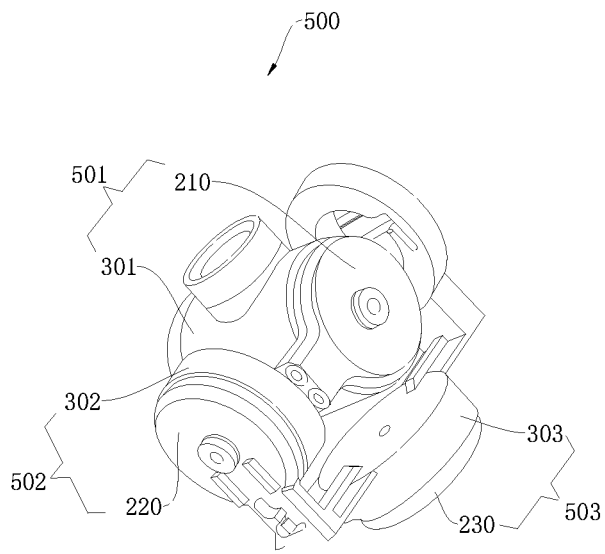
FIG. 6 is a schematic diagram of the gimbal assembly of the present disclosure with an electric motor marked.

Please further refer to FIG. 2 and FIG. 5 as well as FIG. 6, FIG. 6 illustrates an electric motor 500 of the gimbal, and the gimbal 500 includes a first electric motor 501, a second electric motor 502 and a third electric motor 503. It can be understood that, the electric motor 500 may be other drive unit including a drive part and a rotation part, and the drive part may drive the rotation part through a linkage mechanism, a cam mechanism, a gear transmission, a belt transmission or a chain transmission, for example, the electric motor 500 may be a motor. The first electric motor, the second electric motor and the third electric motor can be referred to a holding assembly.

The first electric motor 501 includes a first drive part 210 and a first rotation part 301 driven by the first drive part 210. For example, the first drive part 210 is a stator of the first electric motor 501, and the first rotation part 301 is a rotor of the first electric motor 501.

The second electric motor 502 includes a second drive part 220 and a second rotation part 302 driven by the second drive part 220. For example, the second drive part 220 is a stator of the second electric motor 502, and the second rotation part 302 is a rotor of the second electric motor 502.

The third electric motor 503 includes a third drive part 230 and a third rotation part 303 driven by the third drive part 230. For example, the third drive part 230 is a stator of the third electric motor 503, and the third rotation part 303 is a rotor of the third electric motor 503.

In some examples, the first drive part 210 and the first connecting piece 410 are integrally formed, the second drive part 220 and the second connecting piece 420 are integrally formed, and the third rotation part 303 and the third connecting piece 430 are integrally formed.

Figure 7:
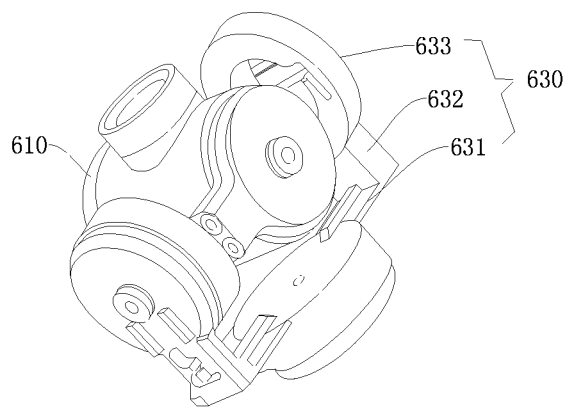
FIG. 7 is a perspective schematic diagram of the gimbal assembly of the present disclosure with a first counterweight and a third counterweight marked.

Please further refer to FIG. 2 and FIG. 6 as well as FIG. 7, the gimbal assembly 100 is provided with a first counterweight 610, a second counterweight (not illustrated) and a third counterweight 630 for adjusting a gravity center of the gimbal 110, and the third counterweight 630 includes a first portion 631, a second portion 632 and a third portion 633. In the embodiment, the third rotation part 303, the third connecting piece 430 and the first portion 631 are integrally formed.

Since the first drive part 210 of the first electric motor 501 is connected with the second rotation part 302 by the first connecting piece, when the second rotation part 302 of the second electric motor 502 rotates around a second axis 320, the first electric motor 501 connected with the second electric motor 502 synchronously rotates around the second axis 320 with the second electric motor 502. The first electric motor 501 is provided with a first counterweight 610 for adjusting a gravity center of the gimbal 110, so that the gravity center of the gimbal 110 is located in a spherical center 121 of the light-transmitting cover 120, and thus avoiding decentration of the second rotation part 302, and ensuring stability and equilibrium of the second electric motor 502 as a whole when the second rotation part 302 rotates around the second axis 320.

Since the second drive part 220 of the second electric motor 502 is connected with the third rotation part 303 of the third electric motor 503 by the second connecting piece and the third connecting piece 430, when the third rotation part 303 of the third electric motor 503 rotates around a third axis 330, the second electric motor 502 connected with the third electric motor 503 and the first electric motor 501 connected with the second electric motor 502 synchronously rotate around the third axis 330 with the third electric motor 503. The third rotation part 303 is provided with a third counterweight 630 for adjusting a gravity center of the gimbal 110, so that the gravity center of the gimbal 110 is located in a spherical center 121 of the light-transmitting cover 120, and thus avoiding decentration of the third rotation part 303, and ensuring stability and equilibrium of the third electric motor 503 as a whole when the third rotation part 303 rotates around the third axis 330.

In the embodiment, the first portion 631 of the third counterweight 630 is symmetric with the third connecting piece 430 in position, has a same shape as that of the third connecting piece 430, and has equivalent mass to the third connecting piece 430; the second portion 632 is symmetric with the second connecting piece 420 in position, has a same shape as that of the second connecting piece 420, and has equivalent mass to the second connecting piece 420; and a mass of the third portion 633 is equal to a sum of masses of the second drive part 220, the second rotation part 302 and the first connecting piece 410. In other embodiments, the third counterweight 630 may be of other shapes by which the gravity center of the gimbal 110 is located in the spherical center 121.

The gimbal 110 is further provided with a second counterweight (not illustrated) for adjusting the gravity center of the gimbal 110, and the second counterweight is arranged inside the first rotation part 301, so that the gravity center of the gimbal 110 is located in the spherical center 121, and thus avoiding decentration of the first rotation part 301, and ensuring stability and equilibrium of the first electric motor 501 as a whole when the first rotation part 301 rotates around the first axis 310.

In addition, it should be noted that, according to the embodiment of the present disclosure, it is not limited to arranging the counterweight in the manners described above, as long as the gravity center of the gimbal 110 is located in the spherical center 121 through the arrangement of the counterweight.

Figure 8:
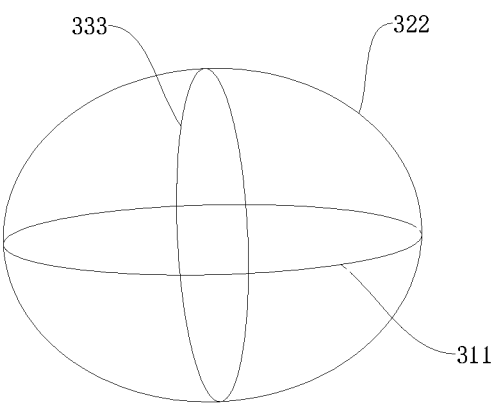
FIG. 8 is a schematic diagram of motion trajectories of a first rotation part, a second rotation part and a third rotation part of the gimbal assembly of the present disclosure.

Please refer to FIG. 2 and FIG. 8, the first rotation part 301 rotates around the first axis 310, a motion trajectory thereof is a first path 311, and the first drive part 210 may drive the first rotation part 301 to rotate by 360 degrees on the first path 311; the second rotation part 302 rotates around the second axis 320, a motion trajectory thereof is a second path 322, and the second drive part 220 may drive the second rotation part 302 to rotate by 360 degrees on the second path 322; and the third rotation part 303 rotates around the third axis 330, a motion trajectory thereof is a third path 333, and the third drive part 230 may drive the third rotation part 303 to rotate by 360 degrees on the third path 333. In practical applications, rotating ranges of the first rotation part 301, the second rotation part 302 and the third rotation part 303 may be defined according to actual situations.

Cross-sections of the first path 311, the second path 322 and the third path 333 respectively intersecting with the light-transmitting cover 120 are great circles passing through the spherical center 121. The third axis 330 corresponds to an X direction in 3D coordinates, the second axis 320 corresponds to a Y direction in 3D coordinates, and the first axis 310 corresponds to a Z direction in 3D coordinates.

Figure 9:
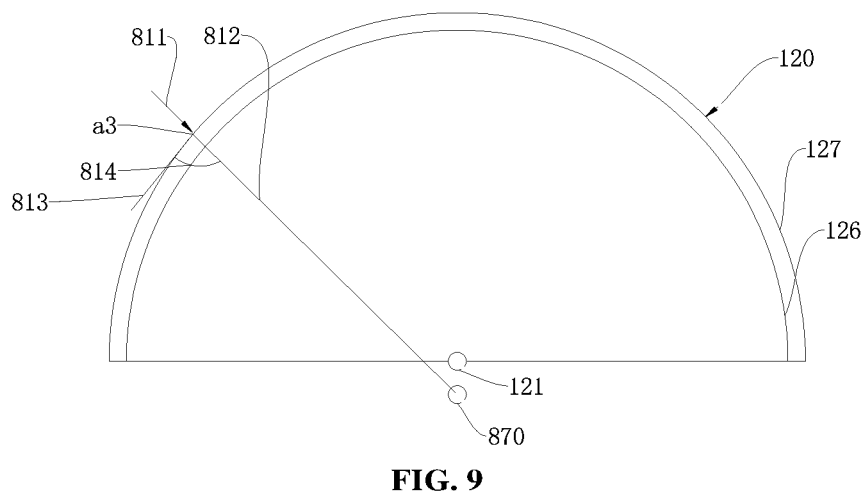
FIG. 9 is a schematic diagram of capturing light in a gimbal assembly in a related art.

Please refer to FIG. 9, FIG. 9 illustrates a gimbal assembly in a related art; the light-transmitting cover 120 has an inner wall 126 and an outer wall 127, light is incident into the light-transmitting cover 120 after passing through the outer wall 127 and the inner wall 126 at a point a3. An angle between a first lens optical axis 812 of the lens and a first tangent plane 813 of the outer wall 127 of the light-transmitting cover is a first angle 814, and the first angle 814 is about 85.3 degrees, light captured by the image pick-up device of the gimbal assembly at the point a3 is light not vertically incident into the light-transmitting cover 120. Since an intersection of a rotating axis 870 of the gimbal and the first lens optical axis 812 does not coincide with the spherical center 121 of the light-transmitting cover 120, a first strongest light 811 and the lens optical axis of the image pick-up device are not in a same straight line, and the image pick-up device of the gimbal assembly cannot capture the first strongest light 811.

Figure 10:
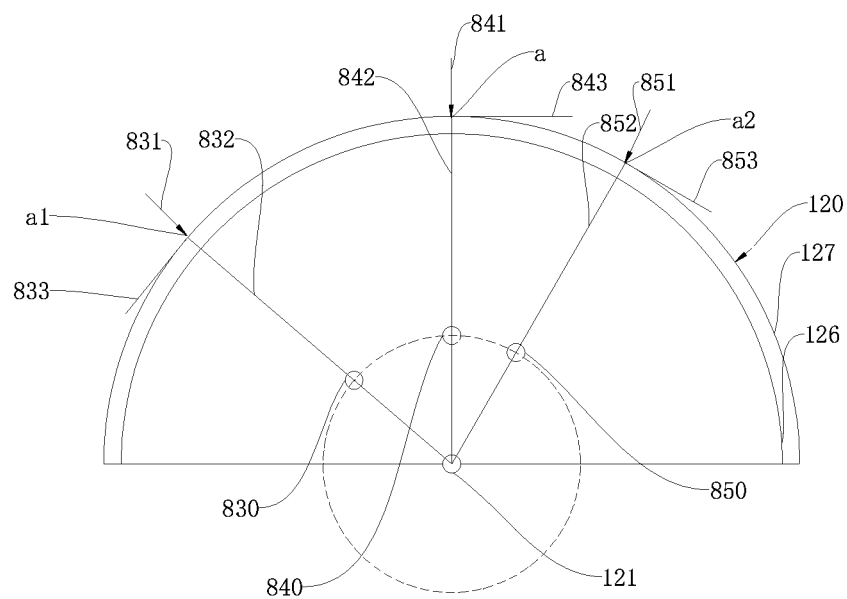
FIG. 10 is a schematic diagram of capturing light in the gimbal assembly of the present disclosure.
Figure 11:
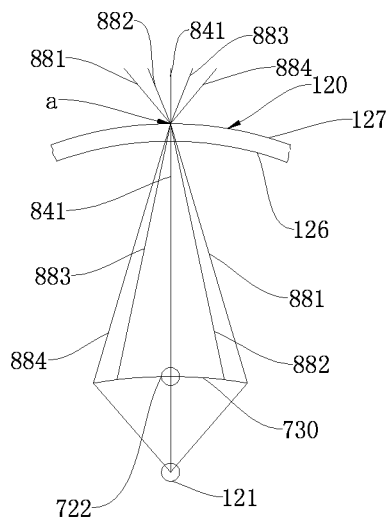
FIG. 11 is a V-shaped lighting schematic diagram of a lens of an image pick-up device of the gimbal assembly of the present disclosure.

Please further refer to FIG. 2 and refer to FIG. 10 and FIG. 11, each point on the light-transmitting cover 120 has a tangent plane, a propagation direction of light perpendicular to the tangent plane and incident into the light-transmitting cover 120 does not deflect, and the beam of light is the strongest light incident into the light-transmitting cover 120.

The first axis 310, the second axis 320, the third axis 330 and a lens optical axis 721 intersect at an intersection 350, and the intersection 350 coincides with the spherical center 121 of the light-transmitting cover 120; the image pick-up device 720 moves with the gimbal 110 during shooting, when the image pick-up device 720 shoots in any position, an angle between a normal line passing through a lens central point 722 of the lens 730 of the image pick-up device 720 and a tangent plane at an intersection of the normal line and the light-transmitting cover 120 is always 90 degrees, the strongest light vertically incident into the light-transmitting cover 120 coincides with the normal line passing through the central point 722 of the lens, and the strongest light vertically incident into the light-transmitting cover 120 transmits along the normal line passing through the central point 722 of the lens. In the drawings, the normal line passing the central point 722 of the lens is the strongest light.

In some examples, as illustrated in FIG. 2, the first axis 310, the second axis 320 and the third axis 330 are perpendicular to each other.

The lens optical axis 721 is always perpendicular to the tangent plane (e.g., the lens optical axis 721 always passes through the spherical center 121), the strongest light vertically incident into the tangent plane without deviation and the lens optical axis 721 are always in a same straight line, and the lens optical axis passes through the intersection 350. For example, the lens optical axis is a line perpendicular to a plane tangent to the central point of a surface of the lens. In some examples, the lens optical axis coincides with the axis of rotational symmetry or the mechanical axis of the lens. The strongest light without deflection is always incident into the lens 730 of the image pick-up device 720, and the image pick-up device 720 may always capture the beam of the strongest light, so that captured image is much clearer, and shooting quality of the image pick-up device is ensured.

In the embodiment, the intersection of the first axis 310, the second axis 320, the third axis 330 and the lens optical axis 721 and the gravity center of the gimbal 110 are located at the spherical center 121 of the light-transmitting cover 120, and therefore, not only the image pick-up device 720 may always capture the beam of the strongest light, but also stability and equilibrium of movement of the gimbal 110 are ensured.

In FIG. 10, a case where a third strongest light 831, a fourth strongest light 841 and a fifth strongest light 851 are captured by the image pick-up device 720 after they are incident into the light-transmitting cover 120 is taken for example.

A tangent plane at an intersection a1 of a third lens optical axis 832 and the light-transmitting cover 120 is a third tangent plane 833, a third central point 830 of the lens is located on the third lens optical axis 832, the third strongest light 831 perpendicular to the third tangent plane 833 and the lens third optical axis 832 are in a same straight line, and the image pick-up device 720 captures the third strongest light 831.

A tangent plane at an intersection a of a lens fourth optical axis 842 and the light-transmitting cover 120 is a fourth tangent plane 843, a fourth central point 840 of the lens is located on the fourth lens optical axis 842, the fourth strongest light 841 perpendicular to the fourth tangent plane 843 and the fourth lens optical axis 842 are in a same straight line, and the image pick-up device 720 captures the fourth strongest light 841.

A tangent plane at an intersection a2 of a fifth lens optical axis 852 and the light-transmitting cover 120 is a fifth tangent plane 853, a fifth central point 850 of the lens is located on the fifth lens optical axis 852, the fifth strongest light 851 perpendicular to the fifth tangent plane 853 and the fifth lens optical axis 852 are in a same straight line, and the image pick-up device 720 captures the fifth strongest light 851.

When the intersection 350 coincides with the spherical center 121 of the light-transmitting cover 120, when the image pick-up device 720 is in different positions, strongest light perpendicular to a tangent plane of each point on the light-transmitting cover 120 is always incident into the image pick-up device 720, so that intensities of light captured by the image pick-up device 720 in different positions are the same, ensuring image quality of the image pick-up device 720 and improving resolution of the image.

Please refer to FIG. 11, light irradiates a point a and passes through the inner wall 126 and the outer wall 127 of the light-transmitting cover 120, the fourth strongest light 841 passes through the light-transmitting cover 120 without deflection, and irradiates a central point 722 of the lens 730, the central point 722 is in a line between the point a and the spherical center 121, the lens 730 captures a first light 881 and a second light 882 on a side of the fourth strongest light 841, and the lens 730 further captures a third light 883 and a fourth light 884 on the other side of the fourth strongest light 841, a lighting range of the lens 730 is V-shaped, surrounding light captured by the lens 730 is relatively uniform, so that captured image is much clearer, and shooting quality of the image pick-up device 720 is further ensured.

In the embodiment, the gimbal 110 is a three-axis gimbal, the first drive part 210 is connected with the second rotation part 302 by the first connecting piece 410, the second drive part 220 is connected with the third rotation part 303 by the second connecting piece 420 and the third connecting piece 430, so that structure of the gimbal 110 is more compact, and the rotation unit 300 of the gimbal 110 is more stable during rotating.

In another embodiment, the drive unit 200 of the gimbal 110 may only include two of the first drive part 210, the second drive part 220 and the third drive part 230, and the rotation unit 300 of the gimbal 110 may only include two of the first rotation part 301, the second rotation part 302 and the third rotation part 303.

In an example, the drive unit 200 only includes the first drive part 210 and the second drive part 220, and the rotation unit 300 only includes the first rotation part 301 and the second rotation part 302. For example, the lens optical axis 721 is perpendicular to the first axis 310 of the first rotation part 301. The first axis 310, the second axis 320 and the lens optical axis 721 intersect at an intersection 350, and the intersection 350 coincides with the spherical center 121 of the light-transmitting cover 120. At the time of shooting, the image pick-up device 720 may rotate around the first axis 310 and the second axis 320 with the gimbal 110, the lens 730 of the image pick-up device 720 always captures strongest light without deflection, and the strongest light is perpendicular to a tangent plane at an intersection of a normal line of the lens 730 and the light-transmitting cover, so that resolution of captured image is higher, and quality of the image is ensured.

In another example, the drive unit 200 only includes the first drive part 210 and the third drive part 230, and the rotation unit 300 only includes the first rotation part 301 and the third rotation part 303. For example, the lens optical axis 721 is perpendicular to the first axis 310 of the first rotation part 301. The first axis 310, the third axis 330 and the lens optical axis 721 intersect at an intersection 350, and the intersection 350 coincides with the spherical center 121 of the light-transmitting cover 120. At the time of shooting, the image pick-up device 720 may rotate around the first axis 310 and the third axis 330 with the gimbal 110, the lens 730 of the image pick-up device 720 always captures strongest light without deflection, and the strongest light is perpendicular to a tangent plane at an intersection of a normal line of the lens 730 and the light-transmitting cover, so that resolution of captured image is higher, and quality of the image is ensured.

In yet another example, the drive unit 200 only includes the second drive part 220 and the third drive part 230, and the rotation unit 300 only includes the second rotation part 302 and the third rotation part 303. For example, the lens optical axis 721 is perpendicular to the second axis 320 of the second rotation part 302. The second axis 320, the third axis 330 and the lens optical axis 721 intersect at an intersection 350, and the intersection 350 coincides with the spherical center 121 of the light-transmitting cover 120. At the time of shooting, the image pick-up device 720 may rotate around the second axis 320 and the third axis 330 with the gimbal 110, the lens 730 of the image pick-up device 720 always captures strongest light without deflection, and the strongest light is perpendicular to a tangent plane at an intersection of a normal line of the lens 730 and the light-transmitting cover, so that resolution of captured image is higher, and quality of the image is ensured.

In yet another embodiment, the drive unit 200 of the gimbal 110 may only include one of the first drive part 210, the second drive part 220 and the third drive part 230, and the rotation unit 300 of the gimbal 110 may only include one of the first rotation part 301, the second rotation part 302 and the third rotation part 303.

In an example, the drive unit 200 only includes the first drive part 210, and the rotation unit 300 only includes the first rotation part 301. For example, the lens optical axis 721 is perpendicular to the first axis 310 of the first rotation part 301. An intersection of the first axis 310 and the lens optical axis 721 is located at the spherical center 121 of the light-transmitting cover 120. At the time of shooting, the image pick-up device 720 may rotate around the first axis 310 with the gimbal 110, the lens 730 of the image pick-up device 720 always captures strongest light without deflection, and the strongest light is perpendicular to a tangent plane at an intersection of a normal line of the lens 730 and the light-transmitting cover, so that resolution of captured image is higher, and quality of the image is ensured.

In another example, the drive unit 200 only includes the second drive part 220, and the rotation unit 300 only includes the second rotation part 302. For example, the lens optical axis 721 is perpendicular to the second axis 320 of the second rotation part 302. An intersection of the second axis 320 and the lens optical axis 721 is located at the spherical center 121 of the light-transmitting cover 120. At the time of shooting, the image pick-up device 720 may rotate around the second axis 320 with the gimbal 110, the lens 730 of the image pick-up device 720 always captures strongest light without deflection, and the strongest light is perpendicular to a tangent plane at an intersection of a normal line of the lens 730 and the light-transmitting cover, so that resolution of captured image is higher, and quality of the image is ensured.

In the embodiment that only one drive part and one rotation part are included, it is described by taking an example that the lens optical axis is perpendicular to the rotating axis; however, the embodiment of the present disclosure is not limited thereto, and there may be an angle between the lens optical axis and the rotating axis.

Figure 12:
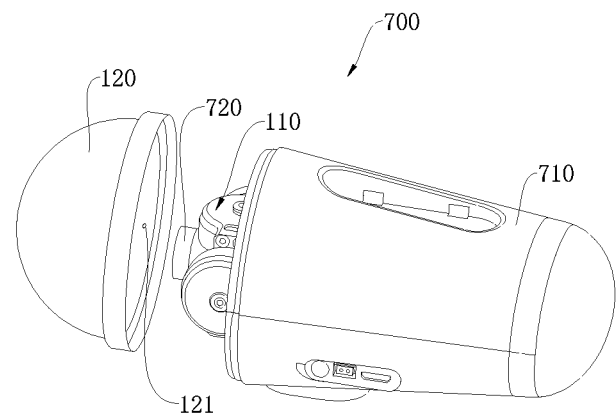
FIG. 12 is an exploded perspective schematic diagram of a hand-held device of the present disclosure.

Please refer to FIG. 2 and FIG. 12, the present disclosure further provides a hand-held device 700, and the hand-held device 700 comprises a holding part 710 and a gimbal assembly 100 described above; the light-transmitting cover 120 of the gimbal 100 is detachably arranged on an end of the holding part 710, and the gimbal 110 of the gimbal assembly 100 is arranged in the holding part. An intersection 350 of the first axis 310, the second axis 320, the third axis 330 and the lens optical axis 721 as well as the gravity center of the gimbal 110 is located in the spherical center 121 of the light-transmitting cover 120.

In the embodiment, the third drive part 230 of the gimbal 110 is connected with the holding part 710. In other embodiments, the third drive part 230 is connected with a mobile device such as an unmanned aerial vehicle (UAV) where the gimbal assembly 100 can be mounted, or a fixed device such as a wall, a mounting wall and so on.

In conclusion, the gimbal assembly 100 comprises a gimbal 110 and a light-transmitting cover 120 arranged outside the gimbal 110; a first drive part 210 of the gimbal 110 drives a first rotation part 301, the first rotation part 301 rotates around a first axis 310, the first rotation part is provided with an image pick-up device 720, and the first axis 310 passes through a spherical center 121 of the light-transmitting cover 120; when ambient light is incident into the light-transmitting cover 120 along a direction of a normal line of a lens 730 of the image pick-up device 720, the lens 730 always captures strongest light, and the strongest light is perpendicular to a tangent plane at an intersection of the normal line of the lens 730 and the light-transmitting cover 120, light surrounding the strongest light captured by the lens 730 is relatively uniform, so that intensities of light captured by the image pick-up device in different positions are the same, captured image is much clearer, shooting quality of the image pick-up device 720 is ensured, and problems in quality of the captured image such as distortion, blurring, brightness changing and so on are avoided.

The foregoing embodiments merely are exemplary embodiments of the present disclosure, and not intended to define the scope of the present disclosure, and the scope of the disclosure is determined by the appended claims.

The application claims priority of Chinese Patent Application No. 201610327305.2 filed on May 17, 2016, the disclosure of which is incorporated herein by reference in its entirety as part of the present application.

The invention claimed is:

1. A gimbal assembly, comprising a gimbal, an image pick-up device and a light-transmitting cover covering the gimbal and the image pick-up device, wherein, the gimbal includes a holding assembly, the holding assembly is configured to drive the image pick-up device to rotate around at least one axis in the light-transmitting cover; the at least one axis passes through a spherical center of the light-transmitting cover, and upon the image pick-up device rotating, an optical axis of a lens of the image pick-up device always coincides with a normal line of a tangent plane at an intersection of the optical axis and the light-transmitting cover, wherein, the holding assembly includes a first electric motor, the first electric motor includes a first rotation part and a first drive part, the at least one axis includes a first axis, and the first drive part drives the first rotation part to rotate around the first axis, wherein, the holding assembly further includes a second electric motor, the second electric motor includes a second rotation part and a second drive part, the at least one axis includes a second axis, the second drive part drives the second rotation part to rotate around the second axis, and the first drive part is connected with the second rotation part by a first connecting piece, wherein, the holding assembly further includes a third electric motor, the third electric motor includes a third rotation part and a third drive part, the at least one axis includes a third axis, the third drive part drives the third rotation part to rotate around the third axis, and the second drive part is connected with the third rotation part by a second connecting piece, wherein, a counterweight is arranged on at least one of the first rotation part of the first electric motor, the second rotation part of the second electric motor and the third rotation part of the third electric motor, so that a gravity center of the gimbal coincides with the spherical center.

2. The gimbal assembly according to claim 1, wherein, the optical axis of the lens passes through the spherical center.

3. The gimbal assembly according to claim 1, wherein, the first electric motor connected with the second electric motor is configured to synchronously rotate around the second axis with the second electric motor.

4. The gimbal assembly according to claim 1, wherein, the second electric motor connected with the third electric motor and the first electric motor connected with the second electric motor are configured to synchronously rotate around the third axis with the third electric motor.

5. The gimbal assembly according to claim 1, wherein, a second counterweight is arranged in the first rotation part of the first electric motor, a first counterweight is arranged on the second electric motor, and a third counterweight is arranged on third electric motor.

6. The gimbal assembly according to claim 1, wherein, the gravity center of the gimbal coincides with the spherical center.

7. The gimbal assembly according to claim 1, wherein, the light-transmitting cover is a hemisphere or a sphere.

* * * * *